(12) United States Patent
Mitsuta et al.

(10) Patent No.: US 10,321,097 B2
(45) Date of Patent: Jun. 11, 2019

(54) PERIMETER MONITORING DEVICE FOR WORK VEHICLE

(71) Applicant: KOMATSU LTD., Tokyo (JP)

(72) Inventors: Shinji Mitsuta, Hiratsuka (JP); Shigeru Harada, Chigasaki (JP); Tomikazu Tanuki, Fujisawa (JP); Eishin Masutani, Hiratsuka (JP); Yukihiro Nakanishi, Hiratsuka (JP); Takeshi Kurihara, Hiratsuka (JP); Dai Tsubone, Hiratsuka (JP); Masaomi Machida, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 190 days.

(21) Appl. No.: 15/283,557

(22) Filed: Oct. 3, 2016

(65) Prior Publication Data

US 2017/0026618 A1    Jan. 26, 2017

Related U.S. Application Data

(63) Continuation of application No. 13/818,353, filed as application No. PCT/JP2012/063134 on May 23, 2012, now Pat. No. 9,497,422.

(30) Foreign Application Priority Data

Jun. 7, 2011 (JP) ................................. 2011-127476
Jun. 9, 2011 (JP) ................................. 2011-129461

(51) Int. Cl.
*H04N 7/18* (2006.01)
*B60R 1/00* (2006.01)
(Continued)

(52) U.S. Cl.
CPC ............. *H04N 7/181* (2013.01); *B60K 35/00* (2013.01); *B60P 1/283* (2013.01); *B60R 1/00* (2013.01);
(Continued)

(58) Field of Classification Search
CPC ..... B60P 1/283; B60R 1/00; B60R 2300/105; B60R 2300/301; B60R 2300/303;
(Continued)

(56) References Cited

U.S. PATENT DOCUMENTS 5,667,076 A    8/1997 Tapp
8,170,787 B2 *   5/2012 Coats ...................... G01S 7/412
                                                                340/435

(Continued)

FOREIGN PATENT DOCUMENTS

JP         11-55656 A      2/1999
JP      2005-56336 A      3/2005
(Continued)

OTHER PUBLICATIONS

International Search Report for the corresponding international application No. PCT/JP2012/063134, dated Jul. 10, 2012.
(Continued)

*Primary Examiner* — Peter D Le
(74) *Attorney, Agent, or Firm* — Global IP Counselors, LLP

(57) ABSTRACT

A perimeter monitoring device is configured to monitor a surrounding of a work vehicle and to display a monitored result on a display device. The perimeter monitoring device comprises a vehicle information detecting part, a plurality of cameras, a bird's-eye image display unit, a plurality of obstacle detecting sensors, an obstacle processing part, and a camera image displaying unit. The vehicle information detecting part detects a speed of the work vehicle. The cameras capture image data regarding the surrounding of the work vehicle. The bird's-eye image display unit displays a bird's-eye image based on the image data. The obstacle detecting sensors detect obstacles in the surrounding. The obstacle processing part issues a warning when an obstacle (Continued)

is detected. The camera image displaying unit displays a camera image adjacent the bird's-eye image. The images are not displayed and the warning is not issued when the vehicle speed exceeds a threshold value.

7 Claims, 6 Drawing Sheets

(51) Int. Cl.
    *E02F 9/26*     (2006.01)
    *G08G 1/16*     (2006.01)
    *B60P 1/28*     (2006.01)
    *B60K 35/00*     (2006.01)
    *H04N 5/232*     (2006.01)
    *H04N 5/247*     (2006.01)
    *B60P 1/04*     (2006.01)
    *B60Q 9/00*     (2006.01)

(52) U.S. Cl.
    CPC ............ *E02F 9/261* (2013.01); *G08G 1/166* (2013.01); *H04N 5/23293* (2013.01); *H04N 5/247* (2013.01); *H04N 7/18* (2013.01); *B60K 2350/1096* (2013.01); *B60P 1/04* (2013.01); *B60Q 9/008* (2013.01); *B60R 2300/105* (2013.01); *B60R 2300/301* (2013.01); *B60R 2300/303* (2013.01); *B60R 2300/607* (2013.01); *B60R 2300/802* (2013.01); *B60R 2300/8093* (2013.01)

(58) Field of Classification Search
    CPC ....... B60R 2300/607; B60R 2300/8093; E02F 9/261; G08G 1/166; H04N 7/18; H04N 7/181
    See application file for complete search history.

(56) References Cited

U.S. PATENT DOCUMENTS

| | | | | |
|---|---|---|---|---|
| 2001/0028393 | A1* | 10/2001 | Tomida | B60R 1/00 348/207.99 |
| 2006/0077050 | A1* | 4/2006 | Takahashi | B60Q 9/008 340/435 |
| 2006/0274147 | A1 | 12/2006 | Chinomi et al. | |
| 2009/0259400 | A1* | 10/2009 | Coats | G01S 7/412 701/301 |
| 2009/0284364 | A1 | 11/2009 | Sawada | |
| 2010/0134325 | A1* | 6/2010 | Gomi | B60R 1/00 340/995.14 |
| 2010/0220189 | A1* | 9/2010 | Yanagi | B60R 1/00 348/148 |
| 2011/0026771 | A1* | 2/2011 | Hsu | G06K 9/00805 382/104 |

FOREIGN PATENT DOCUMENTS

| | | |
|---|---|---|
| JP | 2005-324746 A | 11/2005 |
| JP | 2008-17311 A | 7/2006 |
| JP | 2006-341641 A | 12/2006 |
| JP | 2007-235529 A | 9/2007 |
| JP | 2008-163719 A | 7/2008 |
| JP | 2008-207627 A | 9/2008 |
| JP | 2009-121053 A | 6/2009 |
| JP | 2009-152966 A | 7/2009 |
| JP | 2009-239674 A | 10/2009 |
| JP | 2009-279957 A | 12/2009 |
| JP | 2010-121270 A | 6/2010 |
| JP | 2010-147516 A | 7/2010 |
| JP | 2010-198519 A | 9/2010 |
| JP | 2010-204821 A | 9/2010 |

OTHER PUBLICATIONS

Office Action for the corresponding Japanese application No. 2015-247248, dated Sep. 20, 2016.

Office Action for the corresponding Japanese application No. 2015-247248, dated Oct. 20, 2015.

Office Action for the corresponding Japanese application No. 2015-247248, dated Apr. 28, 2015.

\* cited by examiner

PERIMETER MONITORING DEVICE FOR WORK VEHICLE

CROSS-REFERENCE TO RELATED APPLICATIONS

This application is a continuation application of U.S. patent application Ser. No. 13/818,353, filed Feb. 22, 2013, the entire disclosure of which is hereby incorporated herein by reference. Likewise, this application claims priority to Japanese Patent Application No. 2011-127476 filed on Jun. 7, 2011, and Japanese Patent Application No. 2011-129461 filed on Jun. 9, 2011, the disclosures of which are hereby incorporated herein by reference in their entireties.

TECHNICAL FIELD

The present invention relates to a perimeter monitoring device, and particularly to a perimeter monitoring device configured to monitor the surrounding of a work vehicle and display a monitored result on a display device.

BACKGROUND ART

Dump trucks, used for carrying crushed stones in mines or etc., have been provided as supersized work vehicles. Compared to vehicles such as normal trucks, dump trucks of this type have a remarkably large vehicle width and a large longitudinal length. Therefore, it is difficult for operators thereof to grasp surrounding statuses by means of side mirrors and etc. In view of this, as described in U.S. Patent Application Publication No. US 2009/0259400 A1, for instance, a perimeter monitoring system is provided for efficiently checking the surrounding status of a vehicle.

The system disclosed in the above mentioned publication includes an obstacle detection system, an operator interface, an interface module and a controller connected to these components. When an obstacle is detected, the system is configured to display such dangerous obstacle on a display device and issue a warning to an operator.

On the other hand, Japan Laid-open Patent Application Publication No. JP-A-2010-198519 describes a device configured to present a risk of an obstacle within an active positional range of a working unit. It is herein detected whether or not an obstacle exists in the surrounding of a working machine. When an obstacle exists, a positional relation between a working machine main body and the obstacle is computed, and further, a risk level of making contact with the obstacle is computed based on an operational action of the working machine. Then, alert contents are configured to be outputted to a monitor and an audio output device in accordance with the risk.

SUMMARY

In the system of U.S. Patent Application Publication No. US 2009/0259400 A1, respective areas, corresponding to a plurality of blind spots in the surrounding of the vehicle, are configured to be schematically displayed with icons on a single monitor, and further, an image of a single camera capturing an obstacle is configured to be displayed on the monitor. Further, a blind area (icon), including the position that the obstacle exists, is configured to be flashed (see FIG. 7 and its related description in the specification of U.S. Patent Application Publication No. US 2009/0259400 A1).

However, the number of obstacles in the surrounding of a vehicle is not limited to one, and a plurality of obstacles may exist in some cases. U.S. Patent Application Publication No. US 2009/0259400 A1 does not mention a processing for such case at all.

On the other hand, when a plurality of obstacles exist, the device of Japan Laid-open Patent Application Publication No. JP-A-2010-198519 is configured to display all the obstacles on a monitor (see FIG. 9 and its related description in the specification of Japan Laid-open Patent Application Publication No. JP-A-2010-198519). As described in this publication, an operational range covers all the directions in the case of a working machine such as a hydraulic excavator. Therefore, it is required to display all of the plural obstacles on a monitor.

However, in applying a structure as described in Japan Laid-open Patent Application Publication No. JP-A-2010-198519 to a work vehicle such as a dump truck, even an object, which is not required to be recognized as an obstacle, is supposed to be displayed on a monitor and this makes it difficult to grasp an obstacle that should be normally most watched out.

It is an object of the present invention to enable an operator to easily grasp an object that should be most watched out when a plurality of obstacles are detected in the surrounding of a work vehicle.

A perimeter monitoring device for a work vehicle according to a first aspect is a device configured to monitor a surrounding of the work vehicle and display a monitored result on a display device, and includes a plurality of cameras, a bird's-eye image display unit, a plurality of obstacle detecting sensors, a camera image specifying unit and a camera image displaying unit. The plural cameras are attached to the work vehicle and obtain a plurality of sets of image data regarding the surrounding of the work vehicle. The bird's-eye image display unit displays a bird's-eye image of the surrounding of the work vehicle on the display device based on the sets of image data obtained by the plural cameras. The plural obstacle detecting sensors are attached to the work vehicle and respectively detect obstacles in the surrounding of the work vehicle. The camera image specifying unit is configured to specify a single or plurality of camera images in which a single or plurality of obstacles are shot when the single or plurality of obstacles are detected by the obstacle detecting sensors. The camera image displaying unit is configured to display a relevant camera image, ranked in a high priority ranking based on a priority order set in accordance with travelling states, in alignment with the bird's-eye image on the display device when a plurality of camera images are specified by the camera image specifying unit.

In the present device, the sets of camera image data regarding the surrounding of the vehicle are obtained by the plural cameras. Further, the bird's-eye image of the surrounding of the vehicle is created based on the plural sets of camera image data, and is displayed on the display device. On the other hand, when a single or plurality of obstacles are detected by the plural obstacle detecting sensors, a single or plurality of camera images are specified, in which the single or plurality of obstacles are shot. When a plurality of camera images are herein specified, a camera image, ranked in a high priority ranking based on the priority order set by travelling states, is displayed in alignment with the bird's-eye image on the display device.

When a plurality of obstacles are herein detected in the surrounding of the work vehicle, a plurality of cameras are supposed to exist in which the plural obstacles are shot. In such case, a single camera image, ranked in the highest priority ranking based on the priority order preliminarily set in accordance with travelling states, is displayed in alignment with the bird's-eye image. Therefore, an operator can easily grasp the obstacle that should be watched out most.

A perimeter monitoring device for a work vehicle according to a second aspect relates to the first aspect, and wherein the work vehicle includes an operating room disposed in a position displaced either rightwards or leftwards from a vehicle width directional center. Further, the camera image display unit is configured to display a front directional camera image on an opposite side to a side on which the operating room is disposed in alignment with the bird's-eye image on the display device when no obstacle is detected by the obstacle detecting sensors.

Here, especially in some of work vehicles such as super-sized dump trucks, the operating room is disposed in a position displaced either rightwards or leftwards from the vehicle center. It is quite difficult for an operator of such work vehicle to grasp the status of the opposite side to the side on which the operating room is disposed.

In view of the above, in the perimeter monitoring device of the second aspect, the front directional camera image on the opposite side to the side on which the operating room is disposed is configured to be displayed in alignment with the bird's-eye image when it is not detected that an obstacle exists.

With a camera image, it is herein possible to easily grasp an area, the status of which can be hardly grasped by an operator.

A perimeter monitoring device for a work vehicle according to a third aspect relates to the device of the first or second aspect, and wherein the bird's-eye image display unit is configured to set a plurality of areas corresponding to the plural cameras on a one-to-one basis in the bird's-eye image and display the respective areas in a sectioned manner with frames. Also, the perimeter monitoring device further includes a highlighted frame displaying unit configured to highlight one or more relevant ones of the frames, respectively sectioning one or more areas in which one or more obstacles are located, when the one or more obstacles are detected by the obstacle detecting sensors.

In the present device, the bird's-eye image has a plurality of areas set correspondingly to the plural cameras, and the respective areas are sectioned by the frames. Further, the frame sectioning the area in which an obstacle is positioned is highlighted. Therefore, the position of the obstacle can be more easily and quickly checked.

A perimeter monitoring device for a work vehicle according to a fourth aspect relates to the device of any of the first to third aspects, and further includes a warning unit configured to emit different types of alert sounds in accordance with travelling states and obstacle positions when one or more obstacles are detected by the obstacle detecting sensors.

Here, a warning is issued when an obstacle is detected. Therefore, existence of the obstacle can be easily and quickly checked. Further, different types of alert sounds are emitted depending on the travelling states and the obstacle positions. Therefore, an operator can easily grasp the magnitude of risk based on an alert sound, for instance, when different types of alert sounds are set in accordance with the magnitude of risk of the obstacle.

In the present invention as described above, when a plurality of obstacles are detected in the surrounding of a work vehicle, it is possible to easily grasp an obstacle that should be most watched out.

DESCRIPTION OF THE EMBODIMENTS

An exemplary embodiment of the present invention will be hereinafter explained with reference to drawings. It should be noted that in the following explanation, "front", "rear", "left" and "right" are terms set based on an operator seated on an operator seat and "a vehicle width direction" is a synonym for "a right-and-left direction".

Overall Structure of Dump Truck

Figure 1:
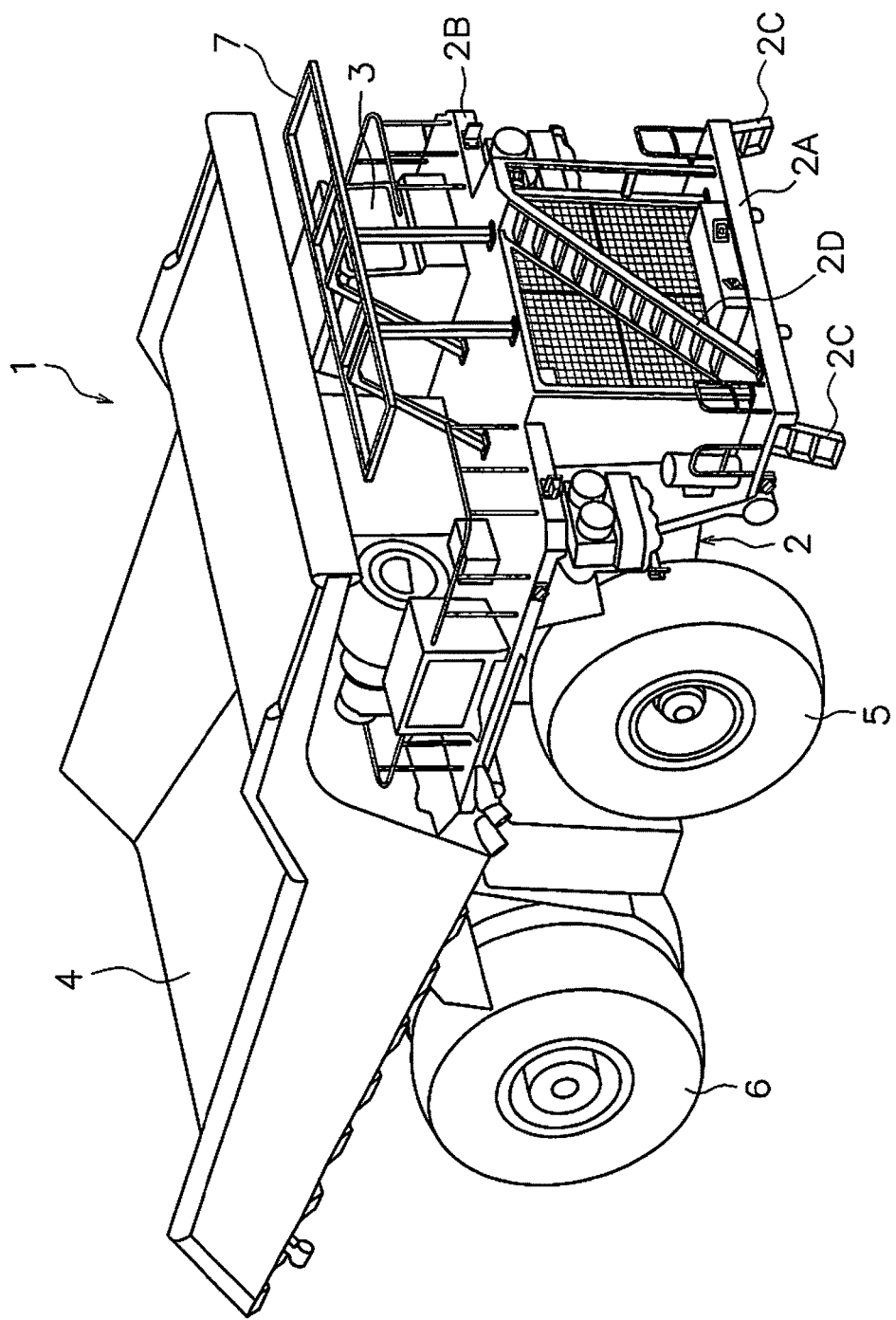
FIG. 1 is a diagram illustrating an entire structure of a dump truck including a perimeter monitoring device according to an exemplary embodiment of the present invention.

FIG. 1 is a perspective view illustrating an entire structure of a dump truck 1 including a perimeter monitoring device according to an exemplary embodiment of the present invention. The dump truck 1 is a self-propelled supersized work vehicle to be used for mining works and etc.

The dump truck 1 mainly includes a vehicle body frame 2, a cab 3 as an operating room, a vessel 4, two front wheels 5, two rear wheels 6 and a base 7 for installing thereon a pantograph for power supply. Further, the present dump truck 1 includes a perimeter monitoring device 10 (see FIG. 2) configured to monitor the surrounding of the vehicle and display the result on a monitor. The structure and the action of the perimeter monitoring device 10 will be described below.

The vehicle body frame 2 supports components (not illustrated in the figures) such as power mechanisms (a diesel engine, a transmission, etc.) and other auxiliary machineries. Further, the front wheels 5 (only a right front wheel is illustrated in FIG. 1) are supported on the right and left sides of the front part of the vehicle body frame 2, while the rear wheels 6 (only a right rear wheel is illustrated in FIG. 1) are supported on the right and left sides of the rear part thereof. The vehicle body frame 2 includes a lower deck 2A on a side closer to the ground, and includes an upper deck 2B over the lower deck 2A. For example, movable ladders 2C are mounted between the lower deck 2A and the ground, whereas an oblique ladder 2D is mounted between the lower deck 2A and the upper deck 2B. Fence-like banisters are fixed to the right and left portions of the front part, the lateral parts and a portion of the rear part on the upper deck 2B.

The cab 3 is disposed on the upper deck 2B while being displaced leftwards from the center in the vehicle width direction. An operator seat, a shift lever, a controller for display, a monitor, a handle, an accelerator pedal, a brake pedal and etc. are mounted within the cab 3. As described below, the controller, the monitor and the shift lever form a part of the perimeter monitoring device 10.

The vessel 4 is a container for loading heavy loads such as crushed stones. The rear-side bottom part of the vessel 4 is pivotally coupled to the rear end portion of the vehicle body frame 2 through pivot pins (not illustrated in the figures) attached to the right and left sides thereof. Accordingly, an actuator such as a hydraulic cylinder (not illustrated in the figure) can cause the vessel 4 to take an uprising posture in which the front part thereof is upwardly pivoted for discharging loads and a loading posture in which the front part thereof is located on the upper part of the cab as illustrated in FIG. 1.

Structure of Perimeter Monitoring Device 10

Figure 2:
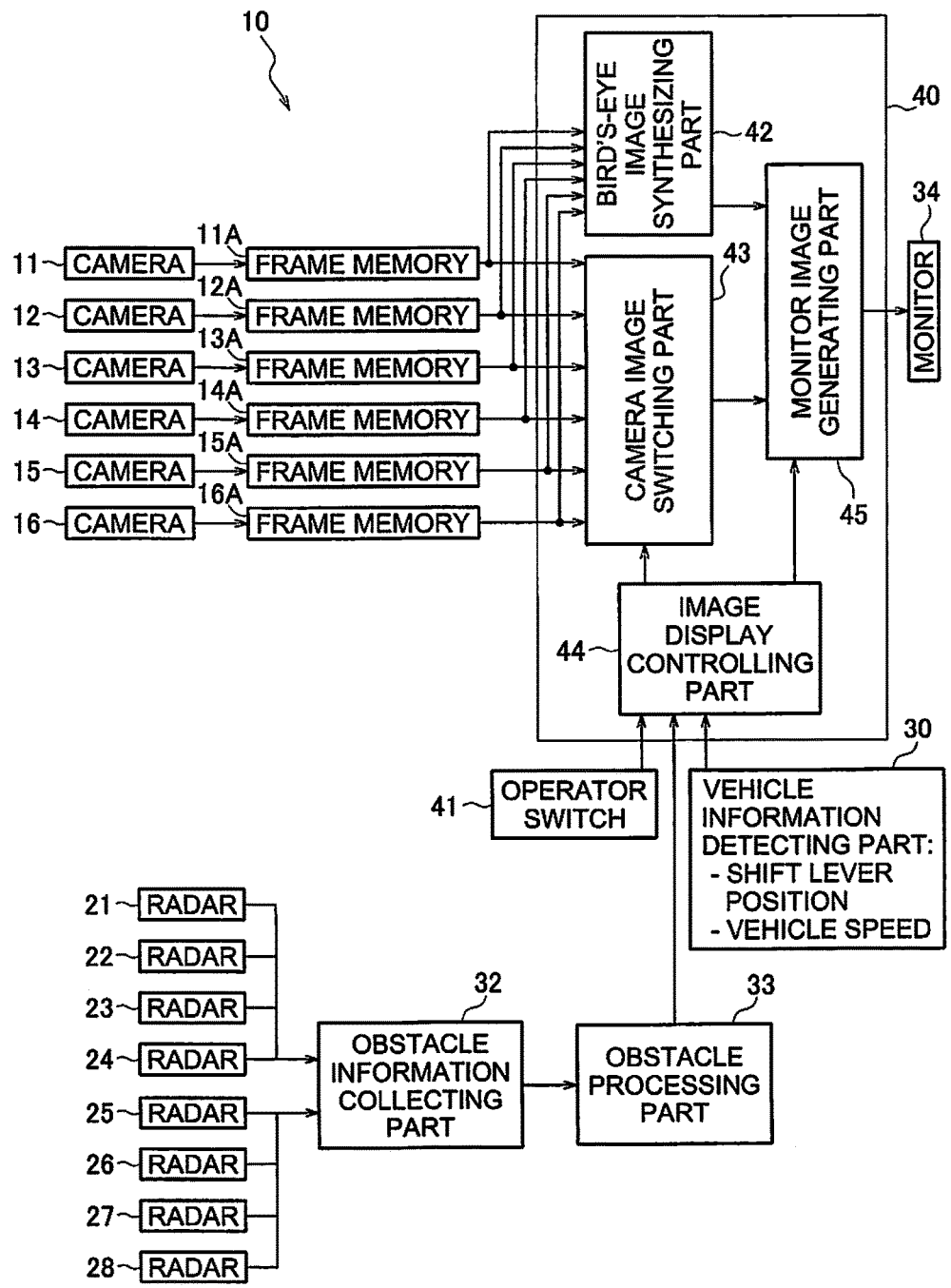
FIG. 2 is a block diagram representing a configuration of the perimeter monitoring device included in the dump truck.

FIG. 2 is a block diagram representing a configuration of the perimeter monitoring device 10 included in the dump truck 1. The perimeter monitoring device 10 includes six cameras 11 to 16, eight radar devices 21 to 28, a vehicle information detecting part 30, an obstacle information collecting part 32, an obstacle processing part 33 and a monitor 34 disposed forwards of the operator seat within the cab 3. Further, the perimeter monitoring device 10 includes a display controller 40 configured to generate an image to be displayed on the monitor 34 based on sets of camera image data from the cameras 11 to 16 and a set of data from the obstacle processing part 33. It should be noted that frame memories 11A to 16A are respectively mounted between the display controller 40 and the respective cameras 11 to 16 in order to temporarily store camera images. Further, an operator switch 41, mounted within the cab 3, is connected to the display controller 40. The operator switch 41 includes a boot switch, a switch for specifying which one should be displayed on the monitor 34 among a plurality of camera images, and etc.

Cameras

Figure 3:
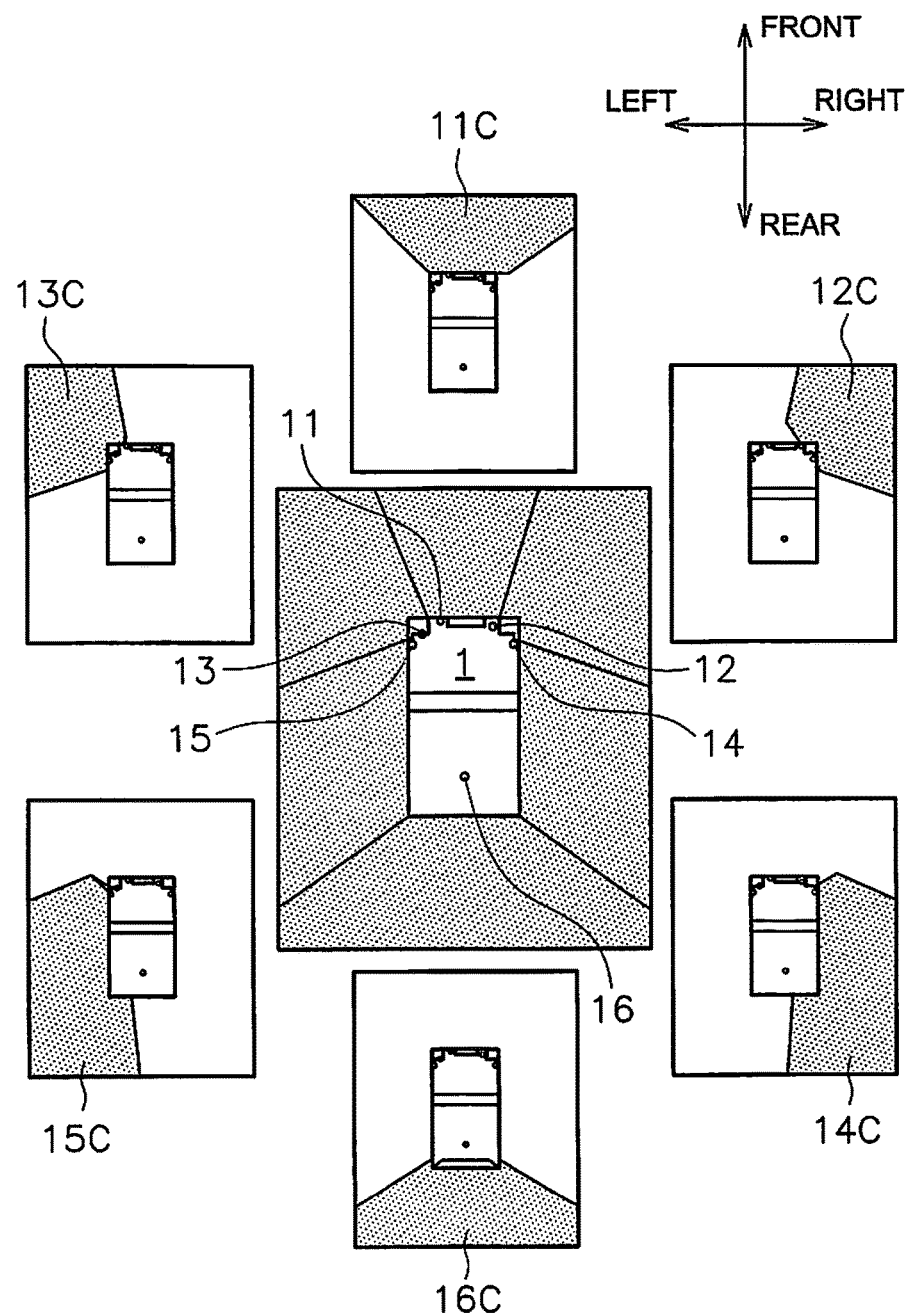
FIG. 3 is a diagram illustrating attached positions of and shooting ranges of six cameras.

The six cameras 11 to 16 are attached to the outer periphery of the dump truck 1 for obtaining images of the surrounding of the dump truck 1. FIG. 3 is a plan view of the dump truck 1 and illustrates the attached positions and the shooting ranges of the six cameras 11 to 16. It should be noted that the shooting ranges are represented by converting actual camera shooting ranges into the respective ranges on a bird's-eye image (see FIG. 6).

The first camera 11 is disposed on the upper end portion of the oblique ladder 2D, and a first shooting range 11C thereof covers the forward direction of the vehicle. The second camera 12 is disposed on the right end portion of the front-side lateral surface of the upper deck 2B, and a second shooting range 12C thereof covers the obliquely right forward direction of the vehicle. The third camera 13 is disposed in a position bilaterally symmetric to the second camera 12, i.e., on the left end portion of the front-side lateral surface of the upper deck 2B, and a third shooting range 13C thereof covers the obliquely left forward direction. The fourth camera 14 is disposed on the front end portion of the right-side lateral surface of the upper deck 2B, and a fourth shooting range 14C thereof covers the obliquely right rear direction. The fifth camera 15 is disposed in a position bilaterally symmetric to the fourth camera 14, i.e., on the front end portion of the left-side lateral surface of the upper deck 2B, and a fifth shooting range 15C thereof covers the obliquely left rear direction. The sixth camera 16 is disposed above an axle shaft coupling the two rear wheels 6 while being disposed in the vicinity of the rotational axis of the vessel 4, and a sixth shooting range 16C thereof covers the rear direction.

According to the aforementioned six cameras 11 to 16, it is possible to obtain an image of the roughly entire surrounding of the dump truck 1 as illustrated in a center diagram of FIG. 3. Each of the six cameras 11 to 16 is configured to transmit a set of data of a camera image, i.e., an image shot by each camera, to the display controller 40 through a corresponding one of the frame memories 11A to 16A.

Radar Devices

Figure 4:
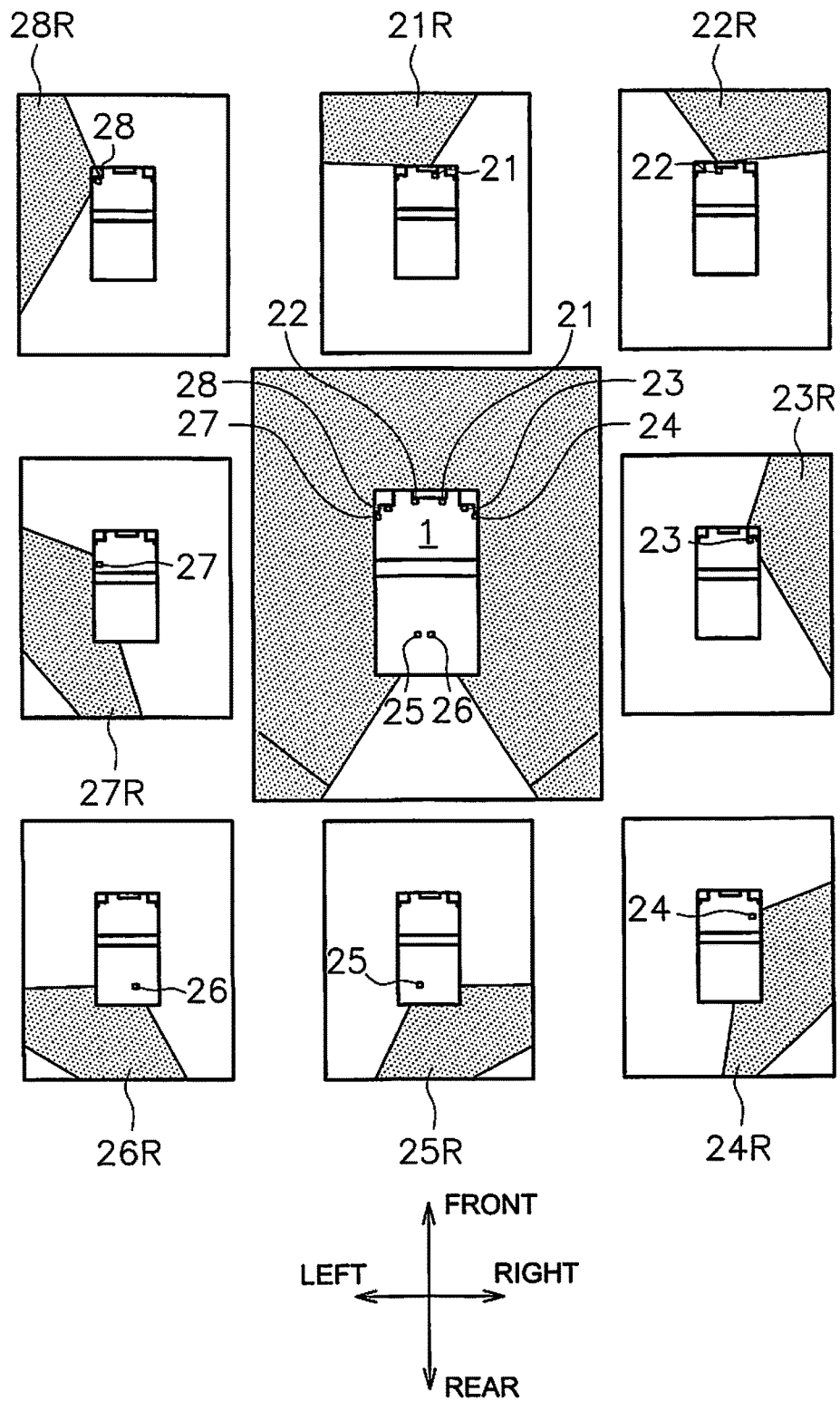
FIG. 4 is a diagram illustrating attached positions of and detection ranges of eight radar devices.

The eight radar devices 21 to 28 are attached to the outer periphery of the dump truck 1 and are configured to detect relative positions of obstacles existing in the surrounding of the dump truck 1. FIG. 4 is a plan view of the dump truck 1 and illustrates attached positions and detection ranges of the eight radar devices 21 to 28. It should be noted that the detection ranges are represented by converting actual detection ranges of the radar devices into ranges on the bird's-eye image (see FIG. 6).

The first radar device 21 is disposed on the lower deck 2A, and a first detection range 21R thereof covers a range from the front direction to the obliquely left front direction of the vehicle. The second radar device 22 is disposed leftwards of the first radar device 21, and a second detection range 22R thereof covers a range from the front direction to the obliquely right front direction of the vehicle. The third radar device 22 is disposed on the front end portion of the right-side lateral surface of the lower deck 2A, and a third detection range 23R thereof covers a range from the obliquely right front direction to the right lateral direction. The fourth radar device 24 is disposed laterally to the vehicle while being disposed in the middle of the lower deck 2A and the upper deck 2B, and a fourth detection range 24R thereof covers a range from the right lateral direction to the rear direction. The fifth radar device 25 is disposed in the vicinity of an axle shaft coupling the two rear wheels 6, and a fifth detection range 25R thereof covers a range from the obliquely right rear direction to the rear direction. The sixth radar device 26 is disposed rightwards of the fifth radar device 25, and a sixth detection range 26R thereof covers a range from the rear direction to the obliquely left rear direction. The seventh radar device 27 is disposed in a position bilaterally symmetric to the fourth radar device 24, and a seventh detection range 27R thereof covers a range from the rear direction to the left lateral direction. The eighth radar device 28 is disposed in a position bilaterally symmetric to the third radar device 22, and an eighth detection range 28R thereof covers a range from the left lateral direction to the obliquely left front direction.

According to the aforementioned eight radar devices 21 to 28, relative positions of obstacles with respect to the dump truck 1 can be detected over the roughly entire surrounding of the dump truck 1 as illustrated in a center diagram of FIG. 4. The eight radar devices 21 to 28 are respectively configured to transmit sets of data regarding detected obstacles to the obstacle processing part 33 through the obstacle information collecting part 32.

Vehicle Information Detecting Part

The vehicle information detecting part 30 is configured to detect the operating position of the shift lever disposed in the periphery of the operator seat within the cab 3 and the vehicle speed to be obtained by a vehicle speed sensor. Further, the vehicle information detection part 30 is configured to transmit these sets of data to the display controller 40.

Obstacle Information Collecting Part and Obstacle Processing Part

The obstacle information collecting part 32 is configured to collect pieces of information received by the respective radar devices 21 to 28 and output the pieces of information to the obstacle processing part 33. The obstacle processing part 33 is configured to compare values of preliminarily set parameters and preliminarily set thresholds and output a piece of obstacle information to the display controller 40. A relative speed between the dump truck 1 and an object, a relative angle therebetween, a relative distance therebetween, and an intensity of a signal from the obstacle (intensity of a radar reflected signal) are set as parameters. The positional coordinate of an object (obstacle) is configured to be computed based on the signal from the object, when the relative speed, the relative angle and the relative distance, amongst these parameters, have values less than or equal to the preliminarily set thresholds while the signal intensity exceeds its threshold. Further, it is determined whether or not the positional coordinate is included in a range that an object is considered as an obstacle and therefore a warning should be issued. When the positional coordinate is included in the warning range, the fact is outputted to the display controller 40 as a piece of obstacle detection information.

Display Controller

The display controller 40 includes a bird's-eye image synthesizing part 42, a camera image switching part 43, an image display controlling part 44 and a monitor image generating part 45.

Figure 5:
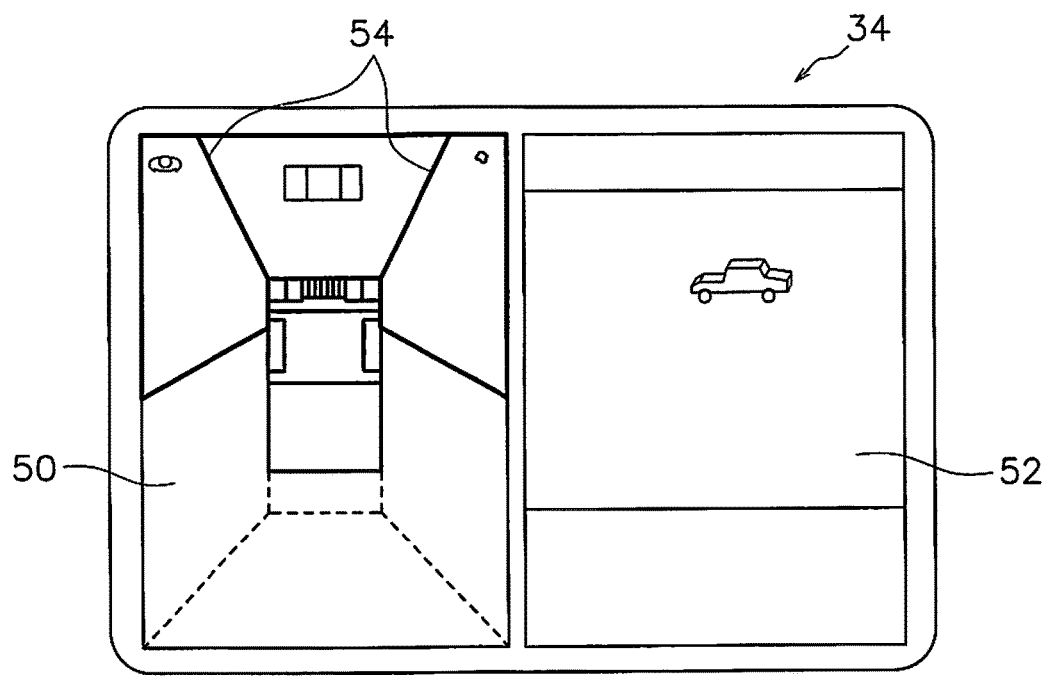
FIG. 5 is a diagram illustrating a display example of a monitor on which a bird's-eye image and a camera image are displayed.

The bird's-eye image synthesizing part 42 is configured to receive a plurality of sets of camera image data from the respective six cameras 11 to 16. Then, the bird's-eye image synthesizing part 42 is configured to synthesize the plural sets of camera image data in order to generate a bird's-eye image 50 regarding the surrounding of the dump truck 1 as illustrated in the left part of FIG. 5. Specifically, the bird's-eye image synthesizing part 42 is configured to execute coordinate conversion with respect to the respective plural sets of camera image data in order to generate a set of bird's-eye image data representing the bird's-eye image 50 in which a plurality of camera images are projected onto a predetermined projection plane. In FIG. 5, the bird's-eye image is displayed on the left part of the single monitor 34, while a single camera image 52 (herein, a front view, i.e., a real-time image being shot by the first camera 11) is displayed on the right part thereof.

Figure 6:
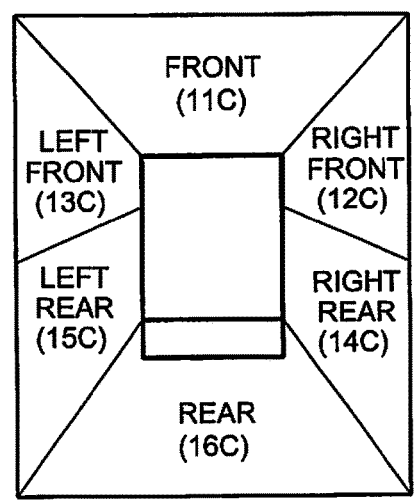
FIG. 6 is a diagram illustrating areas, sectioned correspondingly to the plural cameras, in the bird's-eye image.

It should be noted that a plurality of areas, corresponding to shooting ranges 11C to 16C of the respective cameras 11 to 16, are sectioned and displayed on the bird's-eye image 50. FIG. 6 illustrates the sectioned areas. In FIG. 6, "FRONT", "RIGHT FRONT", "LEFT FRONT", "RIGHT REAR", "LEFT REAR" and "REAR" respectively correspond to the shooting ranges 11C to 16C of the first to sixth cameras 11 to 16.

The camera image switching part 43 is configured to select a camera image to be displayed in alignment with the bird's-eye image. Specifically, the image display controlling part 44 controls and causes the camera image switching part 43 to select one of the plural camera images based on predetermined options. The processing of selecting one of the plural camera images will be described below.

The image display controlling part 44 is configured to receive pieces of information from the operator switch 41 and the vehicle information detecting part 30, and accordingly, control the camera image switching part 43 and the monitor image generating part 45. Further, the image display controlling part 44 is configured to receive the piece of information from the obstacle processing part 33, and accordingly, execute a control of highlighting a frame 54 (see FIG. 5), enclosing an area in which an obstacle exists, on the bird's-eye image 50. Frames, enclosing the respective areas, are normally displayed with dashed lines. It should be noted that the respective areas are basically determined based on the shooting ranges 11C to 16C of the respective cameras 11 to 16, but sizes and shapes thereof can be arbitrarily set.

The monitor image generating part 45 is configured to generate a monitor image so that a set of bird's-eye image data obtained by the bird's-eye image synthesizing part 42 and a single camera image selected by the camera image switching part 43 can be displayed in alignment with each other on the single monitor 34. The set of monitor image data, generated by the monitor image generating part 45, is configured to be outputted to the monitor 34.

Image Display Control

Figure 7:
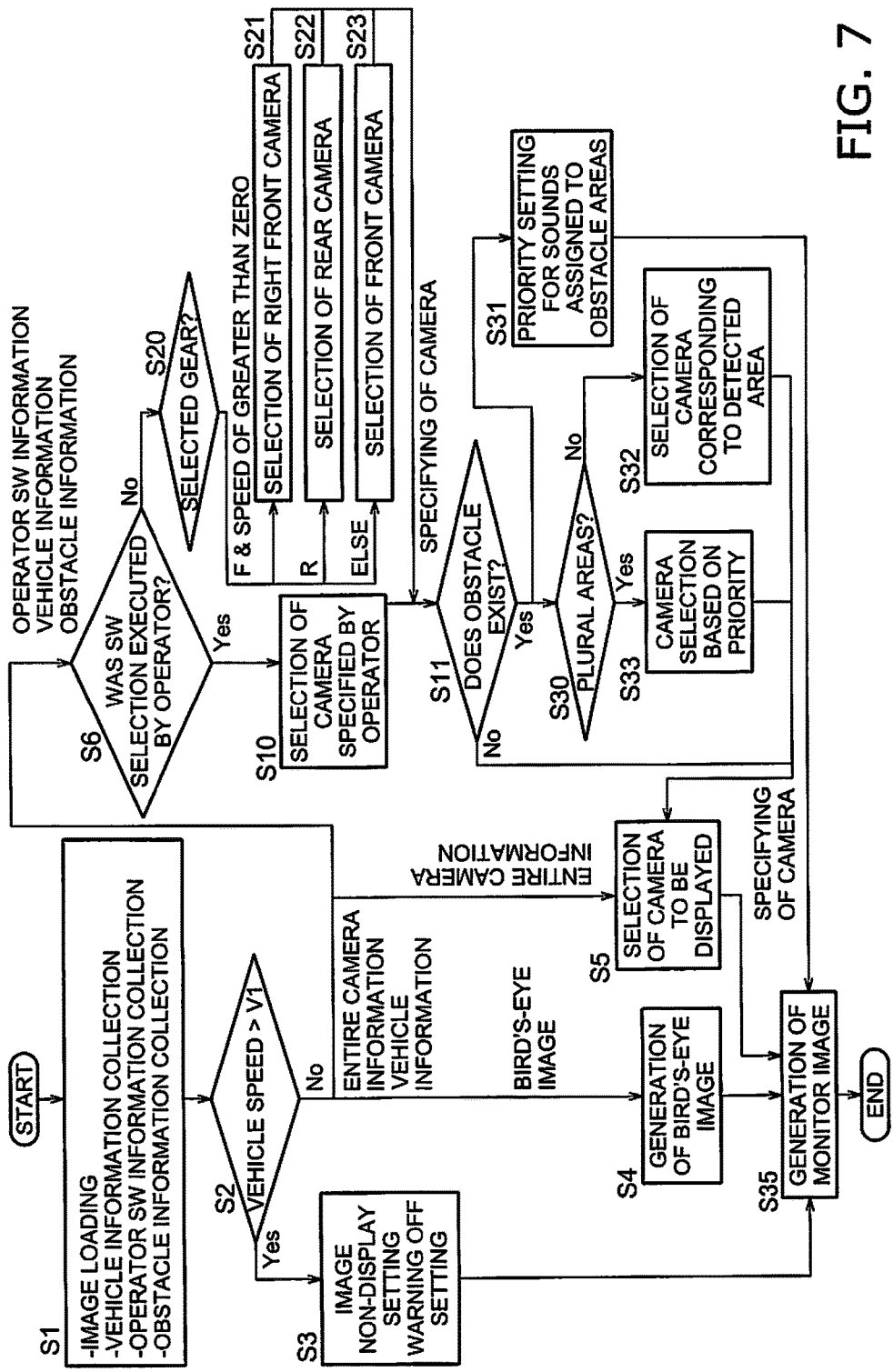
FIG. 7 is a flowchart of a display control processing.

A control processing of displaying an image on the monitor 34 will be explained with respect to the flowchart of FIG. 7. It should be noted that the following sets of data have been preliminarily set and stored in a storage part (not illustrated in the figures) in executing the image display control processing.

Preliminarily Set Data

Vehicle speed: speed V1—a threshold for determining whether or not an image should be displayed on the monitor 34.

Priority order in detecting obstacles: the following Table 1 represents a priority order of cameras to be displayed on the monitor 34 when a plurality of cameras are shooting obstacles. Reference signs enclosed with parentheses "( )" represent the shooting ranges of the respective cameras 11 to 16. Further, "HIGH", "MIDDLE" and "LOW" represent types of alert sounds for an operator. "HIGH" is a type of alert sounds for calling the strongest attention of an operator and the sound on/off cycle thereof is set to be the shortest. The sound on/off cycle of "MIDDLE" is set to be longer than that of "HIGH". The sound on/off cycle of "LOW" is the longest, and the warning level of "LOW" is the weakest.

TABLE 1

| | FORWARD TRAVELLING MODE | REARWARD TRAVELING MODE | STOP |
|---|---|---|---|
| 1ST RANKING | FRONT (11C) • HIGH | REAR (16C) • HIGH | BACK-AND-FORTH DIRECTION • MIDDLE |
| 2ND RANKING | RIGHT FRONT (12C) • HIGH | RIGHT REAR (14C) • HIGH | OTHER THAN BACK-AND-FORTH DIRECTION • LOW |

TABLE 1-continued

|  | FORWARD TRAVELLING MODE | REARWARD TRAVELING MODE | STOP |
|---|---|---|---|
| 3RD RANKING | RIGHT FRONT (13C) • HIGH | LEFT REAR (15C) • HIGH | |
| 4TH RANKING | RIGHT REAR (14C) • MIDDLE | RIGHT FRONT (12C) • MIDDLE | |
| 5TH RANKING | LEFT REAR (15C) • MIDDLE | LEFT FRONT (13C) • MIDDLE | |
| 6TH RANKING | REAR (16C) • MIDDLE | FRONT (11C) • MIDDLE | |

Control Processing

First, in Step S1, a variety of data are loaded from the outside. Specifically, the following sets of data are loaded.
Images: sets of camera image data of the respective cameras 11 to 16.
Vehicle information: the operating position of the shift lever and the vehicle speed.
Operator SW information: a piece of operating information when the operator switch 41 is operated.
Obstacle information: pieces of obstacle information from the respective radar devices 21 to 28.

Next in Step S2, it is determined whether or not the vehicle speed exceeds V1. The processing proceeds to Step S3 when the vehicle speed exceeds V1. In Step S3, the respective images are set not to be displayed on the monitor 34, while a warning as an alert sound is set not to be issued. The settings are done for making an operator to concentrate in driving while the vehicle is travelling at a vehicle speed greater than a predetermined vehicle speed. Further, with the Step S3, no alert sound is emitted while the vehicle is travelling at a vehicle speed greater than the vehicle speed V1 even if an oncoming vehicle is recognized as an obstacle.

The processing proceeds to Steps S4 to S6 when the vehicle speed is less than V1. In Step S4, a bird's-eye image is generated based on the respective sets of camera image data. Further in Step S5, a camera image to be displayed on the monitor 34 is selected. The processing of selecting a camera image is executed based on the processing of Step S6 and its subsequent Steps.

In Step S6, it is determined whether or not a specific camera is selected by the operator. The processing proceeds from Step S6 to Step S10 when the specific camera is selected by the operator. In Step S10, the camera specified by the operator is selected and the processing proceeds to Step S11.

On the other hand, the processing proceeds from Step S6 to Step S20 when no camera is selected by the operator. In Step S20, the operating position of the shift lever is determined. When the operating position of the shift lever is "FPRWARD TRAVELLING" and the vehicle speed exceeds "0", the processing proceeds to Step S21 and the second camera 12 shooting the right front direction is selected. When the operating position of the shift lever is "REARWARD TRAVELLING", the processing proceeds to Step S22 and the sixth camera 16 shooting the rear direction is selected. Except for the aforementioned states, the processing proceeds to Step S23 and the first camera 11 shooting the front direction is selected. For example, when the operating position of the shift lever is "FORWARD TRAVELLING" but the vehicle speed is "0", the first camera 11 shooting the front direction is selected. The processing proceeds to Step S11 after the aforementioned processing.

In Step S11, it is determined whether or not an obstacle is detected. The processing proceeds from Step S11 to Step S5 when no obstacle is detected.

The processing proceeds from Step S11 to Steps S30 and 31 when an obstacle is detected. In Step S30, it is determined whether or not the obstacle is detected by a plurality of radar devices. The processing proceeds from Step S30 to Step S32 when the obstacle is detected by a single radar device. In Step S32, a camera shooting the obstacle is specified and selected based on the set of positional data of the obstacle detected by the radar device, and the processing proceeds to Step S5.

On the other hand, the processing proceeds from Step S30 to Step S33 when a plurality of obstacles are detected by a plurality of radar devices. In Step S33, a single camera ranked highest in the priority order is selected based on Table 1 for determining the priority order, and the processing then proceeds to Step S5.

Based on the above, in Step S5, a camera image to be displayed in alignment with the bird's-eye image on the monitor 34 is supposed to be selected in accordance with the following procedure.

Option 1: when no obstacle is detected and a camera is specified by the operator, the camera image of the camera specified by the operator will be selected.

Option 2: when no obstacle is detected and no camera is specified by the operator, the camera image of the camera selected in accordance with the operating position of the shift lever and the vehicle speed will be selected.

Option 3: when a single obstacle is detected, the camera image of the camera shooting the obstacle will be selected.

Option 4: when a plurality of obstacles are detected by the shooting ranges of a plurality of cameras, the camera image of the camera ranked highest in the preliminarily set priority order will be selected.

With the aforementioned procedure, a monitor image is generated in Step S35 based on the bird's-eye image obtained in Step S4 and the selected camera's camera image obtained in Step S5. Further in Step S35, the frames enclosing the areas in each of which an obstacle exists are highlighted amongst the six sections illustrated in FIG. 5.

Further in Step S31, an alert sound of a predetermined type is set in accordance with the travelling state and the position in which an obstacle is detected. The alert sound type is set based on Table 1. For example, when an obstacle is detected in the front direction during forward travelling, an alert sound type is set that has a short on/off cycle and is harsh to the ear of the operator. Further, a control of emitting an alert sound set in Step S31 is executed aside from the display control represented in FIG. 7.

Through the aforementioned control processing, the monitor 34 displays the following content.

(1) Display in Accordance with Shift Lever Position (Nonexistence of Obstacle)

The bird's-eye image and the front directional camera image are displayed in alignment with each other on the monitor 34 when the shift lever is operated from "STOP" to "FORWARD TRAVELLING" and the vehicle speed is "0".

When the vehicle starts moving forwards, the camera image on the monitor 34 is switched from the front directional camera image to the right front directional camera image. In other words, the bird's-eye image and the right front directional camera image are displayed in alignment with each other on the monitor 34. When the vehicle speed is then further increased and exceeds the vehicle speed V1, the bird's-eye image and a camera image are no longer displayed on the monitor 34.

When the shift lever is operated to "REARWARD TRAVELLING", the bird's-eye image and the rear directional camera image are displayed on the monitor 34.

(2) Display in Obstacle Detection

When a single obstacle is detected, the bird's-eye image and the image of the camera shooting the obstacle are displayed in alignment with each other on the monitor 34. At this time, in the bird's-eye image, the frame of the area corresponding to the shooting range of the camera shooting the obstacle is highlighted while being displayed with a red bold line and blinked.

By contrast, when a plurality of obstacles are detected, the monitor 34 displays the bird's-eye image on the left part thereof. On the other hand, the monitor 34 displays the image of the one ranked highest in the priority order based on Table 1 amongst cameras respectively shooting the plural obstacles on the right part thereof. At this time, in the bird's-eye image, the frames of the plural areas corresponding to the shooting ranges of the plural cameras respectively shooting the plural obstacles are highlighted while being displayed with red bold lines and blinked.

In the example illustrated in FIG. 5, obstacles are detected in three areas "FRONT", "RIGHT FRONT" and "LEFT FRONT". These obstacles are respectively shot by the first camera 11 shooting the front direction, the second camera 12 shooting the right front direction and the third camera 13 shooting the left front direction. Therefore, the frames 54 enclosing the three areas are respectively highlighted in the bird's-eye image 50. Further, the camera image of "FRONT" ranked highest in the priority order based on Table 1, i.e., the camera image of the first camera 11 is displayed on the right part of the monitor 34.

Further, in the example of FIG. 5, an obstacle is detected in the front direction. Therefore, based on Table 1, an alert sound is emitted that has a short on/off cycle and is harsh to the ear of the operator. Accordingly, the operator can find out that an obstacle-related risk is high.

(1) When an obstacle is detected in the surrounding of the dump truck 1, the frame enclosing the area in which the obstacle exists is highlighted in the bird's-eye image, and the image of the camera shooting the obstacle is displayed in alignment with the bird's-eye image on the monitor 34. Therefore, an operator can easily grasp existence of the obstacle.

Further, when a plurality of obstacles are detected, the frames of the areas in which the obstacles exist are highlighted in the bird's-eye image, and the camera image, ranked in the highest priority ranking based on a priority order set in accordance with travelling states, is displayed in alignment with the bird's-eye image on the display device. Therefore, an operator can easily grasp an obstacle that should be watched out most.

(2) When no obstacle is detected, the frontal directional camera image on the opposite side of the cab mounted site is displayed in alignment with the bird's-eye image on the monitor 34. Therefore, through the camera image, an operator can easily grasp the area, the status of which can be hardly grasped by the operator.

(3) When an obstacle is detected, different types of alert sounds are emitted in accordance with the travelling states and the positions of the obstacle. Therefore, an operator can easily grasp the magnitude of risk by the alert sound.

Other Exemplary Embodiments

The present invention is not limited to the exemplary embodiment as described above, and a variety of changes or modifications can be made without departing from the scope of the present invention.

(A) The priority order of cameras, used when a plurality of obstacles are detected or used in accordance with the travelling state, is not limited to that set in the aforementioned exemplary embodiment. The priority order of cameras may be arbitrarily set in accordance with the arrangement of the cab or etc.

(B) In the aforementioned exemplary embodiment, a bird's-eye image and a camera image are configured to be displayed in alignment with each other on a single monitor. However, two monitors may be disposed in alignment with each other, and a bird's-eye image and a camera image may be separately displayed on the respective monitors.

In the perimeter monitoring device of the illustrated embodiment, when a plurality of obstacles are detected in the surrounding of a work vehicle, it is possible to easily grasp the obstacle that should be watched out most.

What is claimed is:

1. A perimeter monitoring device for a work vehicle configured to monitor a surrounding of the work vehicle and to display a monitored result on a display device, the perimeter monitoring device comprising:
   a display controller;
   an obstacle processing part;
   a vehicle information detecting part configured and arranged to detect a vehicle speed of the work vehicle and transmit the vehicle speed to the display controller;
   a plurality of cameras attached to the work vehicle, the cameras being configured and arranged obtain image data regarding the surrounding of the work vehicle and transmit the image data to the display controller; and
   a plurality of obstacle detecting sensors attached to the work vehicle, the obstacle detecting sensors being configured and arranged to detect obstacles in the surrounding of the work vehicle and transmit detection data to the obstacle processing part;
   the obstacle processing part being configured to compute a positional coordinate of an obstacle or a plurality of obstacles when the obstacle detecting sensors have detected the obstacle or the plurality of obstacles, the obstacle processing part being further configured to determine whether or not the positional coordinate is within a warning range and transmit a warning output to the display controller when the positional coordinate is within the warning range, and
   the display controller being configured such that
      when the vehicle speed is smaller than or equal to the predetermined threshold value, the display controller displays a bird's-eye image of the surrounding of the work vehicle on the display device based on the image data obtained by the cameras and displays a camera image based the image data obtained by one of the cameras adjacent to the bird's eye image on the display device,
      when the vehicle speed is smaller than or equal to the predetermined threshold value and the warning output indicates that the positional coordinate is within the warning range, the display controller issues a warning, and when the vehicle speed is larger than the predetermined threshold value, the display controller does not display the bird's-eye image, does not display the camera image, and does not issue the warning regardless of the warning output.

2. The perimeter monitoring device for a work vehicle recited in claim 1, wherein
the display controller is configured to specify one or a plurality of camera images that capture at least one obstacle among the obstacle or plurality of obstacles when the obstacle detecting sensors have detected an obstacle or a plurality of obstacles, and
the display controller is configured to assign a priority ranking to each of the cameras based on a traveling state of the work vehicle and to select a camera image having a highest priority ranking among the camera images specified by the camera image specifying unit as the camera image displayed adjacent to the bird's-eye image.

3. The perimeter monitoring device for a work vehicle recited in claim 1, wherein
the warning is issued as an alert sound.

4. The perimeter monitoring device for a work vehicle recited in claim 3, wherein
the display controller is configured to specify one or a plurality of camera images that capture at least one obstacle among the obstacle or plurality of obstacles when the obstacle detecting sensors have detected an obstacle or a plurality of obstacles, and
the display controller is configured to assign a priority ranking to each of the cameras based on a traveling state of the work vehicle and to select a camera image having a highest priority ranking among the camera images specified by the camera image specifying unit as the camera image displayed adjacent to the bird's-eye image.

5. A perimeter monitoring device for a work vehicle configured to monitor a surrounding of the work vehicle and to display a monitored result on a display device, the perimeter monitoring device comprising:
a vehicle information detecting part configured and arranged to detect a vehicle speed of the work vehicle;
a plurality of cameras attached to the work vehicle, the cameras being configured and arranged obtain image data regarding the surrounding of the work vehicle;
a bird's-eye image display unit configured and arranged to display a bird's-eye image of the surrounding of the work vehicle on the display device based on the image data obtained by the cameras, the bird's-eye image display unit being configured not to display the bird's-eye image when the vehicle speed detected by the vehicle information detecting part is larger than a predetermined threshold value;
a plurality of obstacle detecting sensors attached to the work vehicle, the obstacle detecting sensors being configured and arranged to detect obstacles in the surrounding of the work vehicle;
an obstacle processing part configured to issue an alert sound as a warning when the obstacle detecting sensors have detected an obstacle or a plurality of obstacles, the obstacle processing part being configured not to issue the alert sound when the vehicle speed detected by the vehicle information detecting part is larger than the predetermined threshold value;
a camera image displaying unit configured to display a camera image based the image data obtained by one of the cameras adjacent to the bird's-eye image on the display device, the camera image displaying unit being configured not to display the camera image when the vehicle speed detected by the vehicle information detecting part is larger than the predetermined threshold value;
a camera image specifying unit configured to specify one or a plurality of camera images that capture at least one obstacle among the obstacle or plurality of obstacles when the obstacle detecting sensors have detected an obstacle or a plurality of obstacles,
the camera image displaying unit being configured to assign a priority ranking to each of the cameras based on a traveling state of the work vehicle and to select a camera image having a highest priority ranking among the camera images specified by the camera image specifying unit as the camera image displayed adjacent to the bird's-eye image,
a degree of the alert sound being stronger when the camera image displayed adjacent to the bird's-eye image has a higher priority ranking, and
the degree of the alert sound being weaker when the camera image displayed adjacent to the bird's eye image has lower priority ranking.

6. The perimeter monitoring device for a work vehicle recited in claim 5, wherein
the priority ranking assigned to each the cameras is one of at least a high level and a low level.

7. The perimeter monitoring device for a work vehicle recited in claim 5, wherein
the priority ranking assigned to each the cameras is one of a high level, a middle level, and a low level.

* * * * *